(12) United States Patent
Cha

(10) Patent No.: US 6,419,799 B1
(45) Date of Patent: Jul. 16, 2002

(54) PROCESS FOR MICROWAVE GAS PURIFICATION

(76) Inventor: Chang Yul Cha, 3807 Reynolds St., Laramie, WY (US) 82072

( * ) Notice: Subject to any disclaimer, the term of this patent is extended or adjusted under 35 U.S.C. 154(b) by 0 days.

(21) Appl. No.: 09/662,663

(22) Filed: Sep. 15, 2000

Related U.S. Application Data

(63) Continuation-in-part of application No. 09/249,966, filed on Feb. 12, 1999, now Pat. No. 6,207,023.

(51) Int. Cl.$^7$ .............................................. B01D 53/00
(52) U.S. Cl. ................. 204/157.3; 204/158.2
(58) Field of Search .......................... 204/157.3, 158.2

(56) References Cited

U.S. PATENT DOCUMENTS 5,227,598 A * 7/1993 Woodmansee et al. .. 219/10.55
5,367,147 A * 11/1994 Kim et al. .................. 219/698
5,540,886 A * 7/1996 Warmbier et al. ............ 422/21

FOREIGN PATENT DOCUMENTS

JP 02-230024 * 9/1990

OTHER PUBLICATIONS

Abstract only.*

* cited by examiner

Primary Examiner—Edna Wong
(74) Attorney, Agent, or Firm—John O. Mingle

(57) ABSTRACT

A process of gas purification occurs in the presence of radiofrequency microwave energy and carbonaceous material by decomposing adsorbed impurities on a bed surface at near ambient conditions of temperature and pressure. Further microwave enhanced catalytic oxidation to purificatory gases normally occurs.

14 Claims, 2 Drawing Sheets

PROCESS FOR MICROWAVE GAS PURIFICATION

This application is a continuation-in-part of application Ser. No. 09/249,966, filed Feb. 12, 1999, now U.S. Pat. No. 6,207,023, whose specification is hereby incorporated by reference.

BACKGROUND OF INVENTION

1. Field of Invention

The present invention relates to a process using radiofrequency microwave energy to purify an impure gas stream by employing selective oxidation and selective carbonaceous adsorption.

2. Background

Gaseous impurities occur frequently and regularly contain inorgnic and organic compounds that are volatilized under common conditions. Further depending upon their source they potentially contain other compounds, like silicones. These impurities sometimes naturally pollute a gas stream, like air, and sometimes result in polluted solids, like soil. In all instances release is not feasible without conversion to cleansed gases which are obtainable by both selective oxidation and selective carbonaceous adsorption Adsorption of many vapors occurs readily upon carbonaceous materials, such as activated carbon. Thus a contaminated gas stream passed through a bed of activated carbon will substantially purify it. Saturation of the bed will eventually occur so removal of the adsorbed vapors is performed to allow recycling of the activated carbon. This desorption is conventionally performed by heating the bed to volatilize the vapors. For instance, conventionally steam is employed for this task.

In the general case the subject invention employs microwaves for this desorption since activated carbon is a very good absorber of such microwaves. Then the desorbed volatiles, which are not necessarily in the same chemical form as they were when adsorption occurred, are collected by a sweep gas, which is then treated using microwave-enhanced oxidation. In cases of selected limited impurities, microwave enhanced oxidation combined with microwave enhanced decomposition employing carbonaceous material potentially purifies the gas steam. The concept of purification of a gas has a broad interpretation as it has two common meanings: (1) removal of all such impurities leaving pure gas; and (2) cleansing the gas by changing the chemical form of the impurities so that the residue is not now considered an impurity, such as a substance releasable to the environment. In the subject invention both meanings are employed.

In some instances the impurities contain silicon compounds usually referred to as organosilicon compounds and commonly referred to as silicones. A subset of silicones is siloxanes involving silicon-oxygen linkages and occurs in personal care, commercial and industrial products and therefore often is found at small concentrations in waste materials. A typical siloxane compound is hexamethyldisiloxane, $(CH_3)_3$—Si—O—Si—$(CH_3)_3$. For instance, refer to Smith, Editor, "The Analytical Chemistry of Silicones," Vol. 112 of *Chemical Analysis*, John Wiley and Sons, NY 1991, which is hereby incorporated by reference.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwave" or "microwaves" is generally employed to represent "radiofrequency energies selected from the range of about 500 to 5000 MHz", since in a practical sense this large range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither of these conditions is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates; thus, in this writing the term "microwave catalysis" refers to "the absorption of microwave energy by carbonaceous materials when a simultaneous chemical reaction is occurring" For instance, refer to Kirk-Othmer, *Encyclopedia of Chemical Technology*, 3rd Edition, Volume 15, pages 494–517, Microwave Technology.

Related United States microwaves patents include:

| U.S. Pat. No. | Inventor | Year |
| --- | --- | --- |
| 4,144,189 | Kirkbride | 1979 |
| 4,968,403 | Herbst et al. | 1990 |
| 5,269,892 | Cha | 1993 |
| 5,268,343 | Hopp et al. | 1993 |

Referring to the above list, Kirkbride discloses regeneration of spent fluid cracking catalysts by heating with microwaves to a range of 700–900° F. to remove coke; however, preheating by conventional means is suggested before usage of microwaves. The subject invention operates with much lower temperatures by microwave catalysis not just microwave heating.

Herbst et al. discloses an improvement in the regeneration of cracking catalysts by selective use of microwave heating. High temperatures in the 650–750° C. range are employed. The subject invention employs microwave catalysis not just microwave heating.

Cha discloses char-gas oxide reactions, such as NOx decomposition, catalyzed by microwaves, but does not decompose other impurities. Yet this shows that if any NOx was present as an impurity, it is likely removed.

Hopp et al. disclose a conventional reactivation process for activated charcoal catalyst used with the preparation of R-227 refrigerant by heating to the 450–900° C. range. No microwaves are employed. The subject invention operates with much lower temperatures by microwave catalysis.

SUMMARY OF INVENTION

The objectives of the present invention include overcoming the above-mentioned deficiencies in the prior art and providing a potentially economically viable process for the microwave cleanup of impure gases. Depending upon the impurity content this process occurs in selected stages in the presence of carbonaceous material by decomposing adsorbed impurities near the carbon surface by radiofrequency energy in the microwave range at near ambient conditions of temperature and pressure followed by microwave enhanced oxidation.

DETAILED DESCRIPTION OF INVENTION

Figure 1:
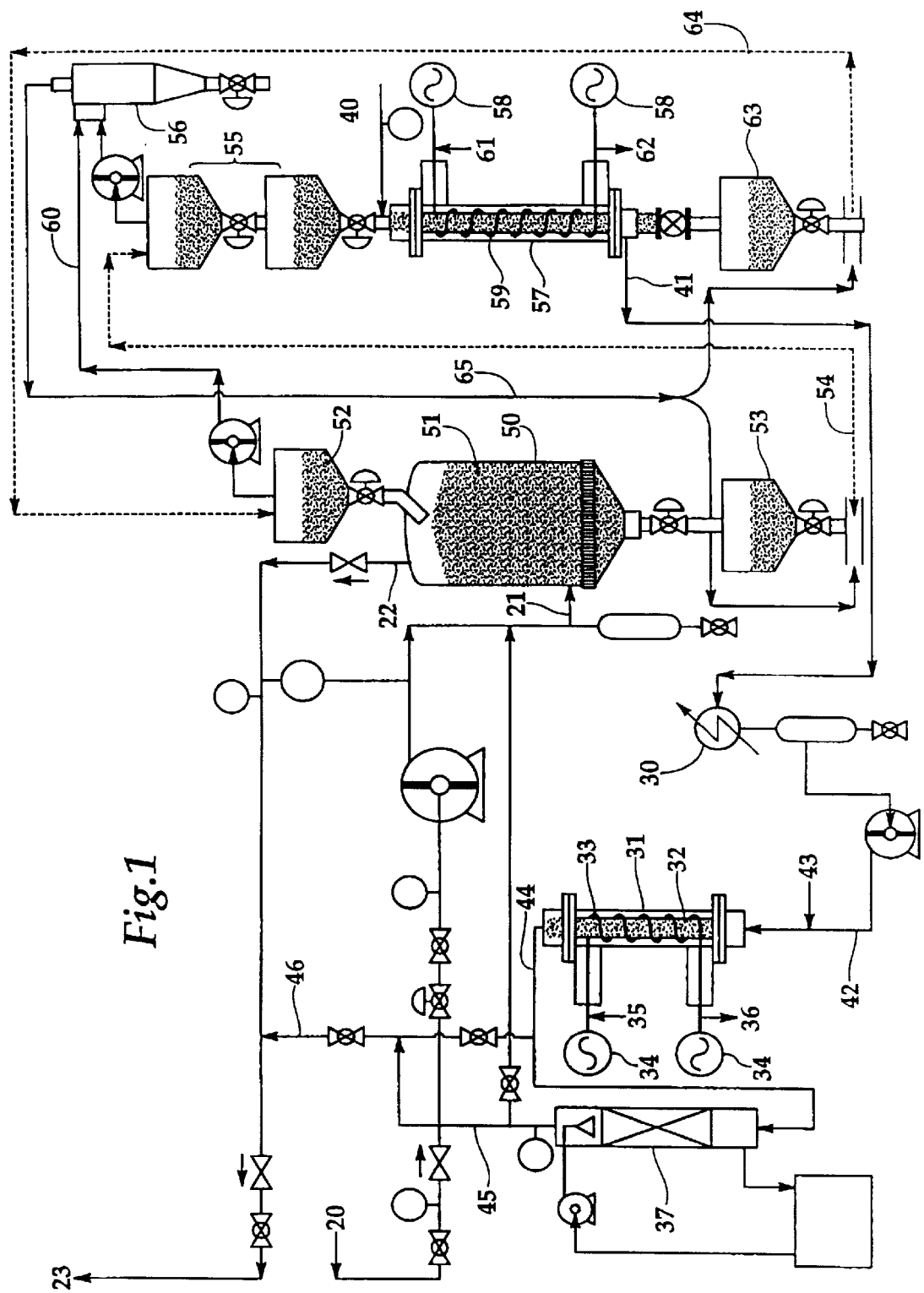
FIG. 1 shows a flow process for the general removal of impurities from a gas stream with subsequent cleanup.

Microwaves are a versatile form of energy that is applicable to enhance chemical reactions since the energy is locally applied by its largely vibrational absorption by polar molecules and further does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in electron vibrational modes. Consequently the waveguide design for the microwave cavity is not usually critical. Carbonaceous material for use with the subject invention commonly comprises activated carbon, char, soot, pyrolytic carbon, carbon black, activated charcoal, and metal carbides. In many instances activated carbon is the preferred material to employ under ambient temperature and pressure conditions, although activated charcoal, if readily available, is likely more cost effective. However in gaseous systems, especially at higher temperatures, other carbonaceous materials such as metal carbides, especially silicon carbide, are convenient to utilize. Silicon carbide is conveniently utilized as a microwave absorbing substrate to enhance conventional catalytic processes.

The microwave excitation of the molecules of the carbonaceous material, often referred to as microwave catalysis, excites constituents, such as impurities and contaminants including inorganic compounds, organic compounds and silicone compounds, which have been adsorbed on, or in some instances attracted to, the internal pore surfaces of the carbonaceous material and produces a highly reactive condition. Further molecules from the carrier medium, such as a sweep gas, are in close proximity or within the surface boundary layer of the carbon surface through chemisorption, absorption, adsorption, or diffusion, and additional chemical reactions with these constituents are possible.

Based upon typical cleanup operations, an equimolar mixture of toluene, o-xylene, and trichloroethylene was employed as a test combination of volatile organic compounds (VOC). For silicone compounds hexamethyldisiloxane represented a typical constituent.

The desorption process potentially produces a wide range of chemical compounds since the microwave excited carbon surface and possibly the sweep gas molecules react with various decomposition products from the adsorbed constituents. The final step consists of the microwave-enhanced oxidation into largely water and carbon dioxide to produce a potentially releasable discharge or recyclable gas. Additionally if halogens, such as chlorine, are present in the VOC, then gaseous halide acids, the most common which is hydrogen chloride, form and may require additional processing before release, such as an alkali scrubber.

FIG. 1 shows a process flow sheet for microwave air purification using all process steps. All components are conventional except those utilizing microwaves. Contaminated air 20 enters and is pumped into the lower level 21 of a moving bed of carbonaceous material 51 fed from a lock-hopper 52 of new or regenerated material and such material leaving into a receiving lock-hopper 53. The air leaves the carbonaceous material bed 51 at the top 22 as clean air and discharged 23. In an air purification process with a closed system such discharged air 23 is recycled. The saturated carbonaceous material is transported 54 into a lock-hopper system 55 which utilizes regeneration reactor off-gas 60 exhausted from the many lock-hoppers and cleaned with a cyclone 56 before use as a recirculation medium 65 to move the carbonaceous material around between various lock-hoppers. The saturated carbonaceous material is fed as a moving bed into the regeneration reactor 57 powered by a microwave system 58 utilizing a helix waveguide 59 and with cooling water in 61 and out 62. After leaving the regeneration reactor 57, the regenerated carbonaceous material is stored in a lock-hopper 63 and eventually recycled 64 back to the main adsorption reactor feed lock-hopper 52. The sweep gas 40 enters and passes down through the regeneration reactor 57 and leaves 41 and flows into a standard water condenser 30 to collect any condensed liquid and then flows 42 entering the oxidation reactor 31. where a stream 43 containing oxygen is mixed. The oxidation reactor 31 composed of a bed of oxidation catalysts 32 is powered by a microwave system 58 connected to an external microwave generator utilizing a helix waveguide 33 and with cooling water in 35 and out 36. These oxidation catalysts are deposited upon a substrate containing microwave absorbing carbonaceous material, often silicon carbide or its equivalent. The gas 44 leaving the oxidation reactor 31 is then tested for halide concentration, or alternatively the entering gas 20 is-tested for halide atoms, and if halides are not present, this gas is mixed with the clean air 22 from the adsorption reactor, 50 and discharged 23. Alternately if sufficient halides are present, the gas 44 passes through a conventional alkali scrubber system 37 which removes any halide acids and flows 45 before being mixed with the clean gas 22 from the adsorption reactor 50 and then discharged 23. It is to be noted that the amount of flow 46 coming from the cleanup system is only a few percent of the principal flow system 22 coming from the adsorption reactor 50 so a large dilution factor occurs. The flow sheet shown in FIG. 1 contains many conventional accessories, like pumps, valves, pressure gages, filters, etc., which are necessary for safe operation of such a chemical process but are outside of the necessary components of the subject invention.

Figure 2:
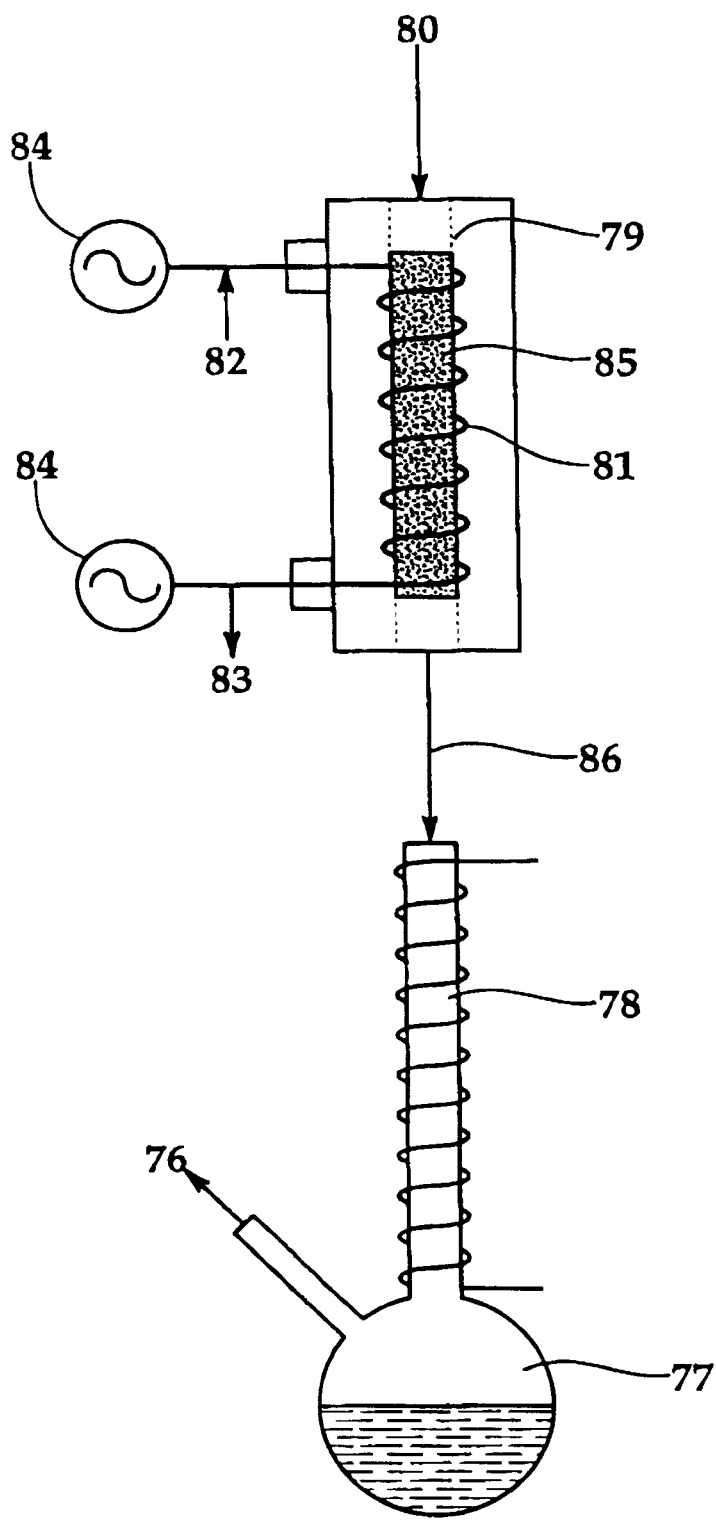
FIG. 2 shows an experimental apparatus for activated carbon regeneration.

FIG. 2 represents an experimental test apparatus to show the effective microwave regeneration of trichloroethylene saturated activated carbon. A quartz tube 79 is packed with activated carbon 85. Around the quartz tube 79 a helix 81 is wound as a microwave waveguide which is fed from microwave connectors 84 which are cooled by entering water 82 and leaving water 83 and are connected to an external microwave generator. Bleed gas enters 80 and leaves 86 into a conventional water condenser 78, which condenses liquid in the flask 77. The bleed gas then exits 76 the experimental apparatus. With the microwave system off, bleed gas containing trichloroethylene passes through the bed and is adsorbed until saturation of the activated carbon occurs. Then trichloroethylene free bleed gas is utilized using the microwave generator to regenerate the activated carbon.

EXAMPLE 1

To study the stability of carbonaceous material under continuing adsorption and desorption cycles, activated carbon was exposed to twenty such cycles. The apparatus of FIG. 2 was employed with a VOC of 200 ppm trichloroethylene. Nitrogen at 50 SCFH was the bleed gas. The microwave energy employed was 850 watts. By the fourth cycle the adsorption capacity had settled down into a substantially constant value, appropriate to the accuracy of the measurements, of 40 grams trichloroethylene per 100 grams of activated carbon. Thus recycling between many adsorption and desorption cycles does not substantially degrade the activated carbon bed.

EXAMPLE 2

The oxidation catalyst apparatus 31, as shown as part of FIG. 1, was utilized separately in an experimental setup to determine the efficiency of the oxidation step. Conventional platinum or palladium oxidation catalysts, such as PRO-VOC-7 manufactured by Protech Company, or equivalent, was utilized on an alumina substrate impregnated with approximately one-fourth by weight fine silicon carbide particles. The input air stream contained a solvent composed of an equimolar mixture of toluene, o-xylene, and trichloroethylene. The microwave power was 850 watts. With a six inch deep oxidation catalyst bed and a gas flow rate of 130 SCFH, solvent flow rates of from 30 to 70 mL/min produced substantially 100 percent destruction efficiency.

EXAMPLE 3

Using the same apparatus as in Example 2, the impurity is now hexamethyl-disiloxane. With the same operating conditions substantially 100 percent destruction efficiency occurs.

EXAMPLE 4

Using the same apparatus as in Example 2, the input gas stream is now 98.5% methane and 1.5% oxygen. With the same operating conditions substantially 100 percent of the oxygen was consumed.

-o-

The subject invention has three integrated processes for microwave gas purification that employ selectively analogous stages depending upon the impurity type and concentration of said gas. The initial process consists of only one stage, which is then employed as the final stage of the subsequent processes.

The first process performs best with a modest flowing gas stream that contains a low concentration of easily oxidizable impurities, so only a single stage consisting of a microwave enhanced bed composed of oxidizing catalysts performs a substantial oxidation of said impurities. Oxygen itself is potentially an impurity and thus is removable by oxidation of other gas constituents.

Process two performs with a modest flowing gas stream that contains considerable impurities particularly of large or quite stable molecules and further is low in oxygen concentration; then a two-stage process is sufficient. Stage one consists of a bed of activated carbon or its equivalent that is irradiated by microwaves and through which the gas passes. This first stage uses microwave catalysis to break up the unwanted molecules. Stage two consists of a bed of microwave enhanced oxidizing catalysts, which the gas leaving from stage one is passed. The final leaving gas is substantially cleansed of its original impurities. The low oxygen content of the gas stream is economically desirable since higher oxygen concentration, such as is present in air, will likely oxidize the activated carbon excessively.

In the general case where no apparent best mode limitations are placed upon the amount of the gas stream or its impurities, three stages occur. The initial stage is an adsorption of the impurities from the gas stream by a bed of unsaturated activated carbon or its equivalent as the gas stream passes through. No microwaves are employed in this first stage. The gas leaving is substantially purified. Stage two removes the bed of activated carbon when it becomes substantially saturated and irradiates it with microwaves while employing a bleed gas to pick up the released vapors. Such vapors consist of desorbed molecules as well as considerable fragmented compounds from the microwave catalysis occurring on the pore surface of the activated carbon. The regenerated activated carbon is potentially recycled back to stage one. Step three consists of a bed of microwave enhanced oxidizing catalysts, which then the bleed gas leaving stage two is passed. The final leaving bleed gas is substantially cleansed and is potentially recycled back to the previous stage.

-o-

A process for microwave purification of a gas comprising passing said gas through an oxidation catalyst bed irradiated by microwaves, wherein said oxidation catalyst is deposited upon a microwave absorbing substrate, and wherein sufficient oxygen is present to obtain anticipated oxidation.

A process for microwave purification of a gas comprising passing said gas through a bed of carbonaceous material while simultaneously irradiating with microwaves, and subsequently passing said gas through an oxidation catalyst bed irradiated by microwaves, wherein said oxidation catalyst is deposited upon a microwave absorbing substrate, and wherein sufficient oxygen is present to obtain anticipated oxidation.

A process for microwave purification of a gas containing impurities comprising adsorbing said impurities from said gas with an unsaturated bed of carbonaceous material until a substantially saturated bed occurs while producing substantially purified gas. Then irradiating said substantially saturated bed with microwaves while a simultaneous sweep gas removes desorbed vapors. Finally passing said sweep gas through an oxidation catalyst bed irradiated by microwaves, wherein said oxidation catalyst is deposited upon a microwave absorbing substrate, and wherein sufficient oxygen is present to obtain substantial oxidation.

In all cases the beds are selected from fluidized, fixed, semi-fluidized, suspended, or moving types, while all carbonaceous material is selected from the group consisting of activated carbon, char, soot, pyrolytic carbon, carbon black, activated charcoal, or metal carbides. In all cases the microwave absorbing substrate is impregnated with metal carbides, normally silicon carbide. The microwaves for all processes are radiofrequency energy from the frequency range consisting of 500 to 5000 Mhz. The potential impurities for these processes are inorganic gases, organic compounds, or silicone compound. Further any silicone compounds are commonly siloxane compounds. Any sweep gas employed is often nitrogen, helium, or carbon dioxide.

-o-

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for microwave purification of a gas comprising:
    passing said gas through a bed of carbonaceous material while simultaneously irradiating with microwaves, wherein said carbonaceous material is capable of microwave catalysis; and
    passing said gas subsequently through an oxidation catalyst bed irradiated by microwaves, wherein said oxidation catalyst is deposited upon a microwave absorbing substrate impregnated with metal carbides, and wherein sufficient oxygen is present to obtain anticipated oxidation.

2. The process according to claim 1 wherein all beds further comprise being selected from the group of beds consisting of fluidized, fixed, semi-fluidized, suspended, and moving.

3. The process according to claim 1 wherein said carbonaceous material further comprises being selected from the group consisting of activated carbon, char, soot, pyrolytic carbon, carbon black, and activated charcoal.

4. The process according to claim 1 wherein said gas further comprises components being selected from the group consisting of inorganic gases, organic compounds, silicone compounds, and combinations thereof.

5. The process according to claim 4 wherein said silicone compounds consist essentially of siloxane compounds.

6. A process for microwave purification of a gas containing impurities comprising:
    adsorbing said impurities from said gas with an unsaturated bed of carbonaceous material until a substantially saturated bed occurs while producing substantially purified gas;
    irradiating said substantially saturated bed with microwaves while a simultaneous sweep gas removes desorbed vapors; and
    passing said sweep gas through an oxidation catalyst bed irradiated by microwaves, wherein said oxidation catalyst is deposited upon a microwave absorbing substrate, and wherein sufficient oxygen is present to obtain substantial oxidation.

7. The process according to claim 6 wherein all beds further comprise being selected from the group of beds consisting of fluidized, fixed, semi-fluidized, suspended, and moving.

8. The process according to claim 6 wherein said carbonaceous material further comprises being selected from the group consisting of activated carbon, char, soot, pyrolytic carbon, carbon black, activated charcoal, and metal carbides.

9. The process according to claim 6 wherein said microwave absorbing substrate further comprises impregnation with metal carbides.

10. The process according to claim 9 wherein said metal carbides consist essentially of silicon carbide.

11. The process according to claim 6 wherein said microwaves further comprise radio-frequency energy selected from the frequency range consisting of 500 to 5000 Mhz.

12. The process according to claim 6 wherein said impurities further comprise components being selected from the group consisting of inorganic gases, organic compounds, silicone compounds, and combinations thereof.

13. The process according to claim 12 wherein said silicone compounds consist essentially of siloxane compounds.

14. The process according to claim 6 wherein said sweep gas further comprises being selected from the group consisting of nitrogen, helium, and carbon dioxide.

* * * * *